(12) United States Patent
Kugler et al.

(10) Patent No.: US 10,356,577 B1
(45) Date of Patent: Jul. 16, 2019

(54) METHOD AND SYSTEM FOR ASSET TRACKING

(71) Applicant: BlackBerry Limited, Waterloo (CA)

(72) Inventors: Andrew Kugler, Ottawa (CA); Sameh Ayoub, Ottawa (CA); Ryan Michael Parker, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/041,324

(22) Filed: Jul. 20, 2018

(51) Int. Cl.
*H04W 24/00* (2009.01)
*H04W 4/35* (2018.01)
*G08G 1/00* (2006.01)
*H04W 4/02* (2018.01)
*H04W 4/029* (2018.01)

(52) U.S. Cl.
CPC .............. *H04W 4/35* (2018.02); *G08G 1/207* (2013.01); *H04W 4/027* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 7,378,960 B1 | 5/2008 | Binding et al. | |
| 9,185,517 B2 | 11/2015 | Kuhl et al. | |
| 2008/0129490 A1 | 6/2008 | Linville et al. | |
| 2010/0149028 A1 | 6/2010 | Mermet et al. | |
| 2014/0184804 A1 | 7/2014 | Lee et al. | |
| 2015/0012148 A1* | 1/2015 | Bhageria, Jr. .......... | G06Q 10/06 700/295 |
| 2018/0041965 A1 | 2/2018 | Komeluk et al. | |

OTHER PUBLICATIONS

Ayoub, Sameh; U.S. Appl. No. 16/016,317, filed Jun. 22, 2018; Title: Method and System for Asset Tracking; 36 pages.

* cited by examiner

*Primary Examiner* — Suhail Khan
(74) *Attorney, Agent, or Firm* — Conley Rose, P.C.; J. Robert Brown, Jr.; Joseph J. Funston, III

(57) ABSTRACT

Described herein is a method for asset transportation verification. The method comprises detecting a trigger for asset transportation verification; tracking one or more first asset location updates of a first asset tracking device; tracking one or more second asset location updates of a second asset tracking device; determining, responsive to the trigger, whether the second asset tracking device is co-located with the first asset tracking device based upon the one or more first asset location updates and the one or more second asset location updates; generating an alert in response to determining the first asset tracking device is not co-located with the second asset tracking device.

22 Claims, 6 Drawing Sheets

METHOD AND SYSTEM FOR ASSET TRACKING

FIELD OF THE DISCLOSURE

The present disclosure relates to asset tracking, and in particular relates to location tracking of a plurality of assets using associated asset tracking devices.

BACKGROUND

Freight transport is the physical process of shipping items between locations. The term shipping originally referred to transport by sea, but in general use it has been extended to additionally encompass transport by land and air.

Asset tracking devices are attached to or form part of shipments in order to track the location of (as well as other operations relating to) those shipments. Asset tracking devices utilize a variety of technologies for location tracking including, for example, radio-frequency identification (RFID), the global positioning system (GPS), and radio signal triangulation. Asset tracking devices gather location data using sensors or receivers and transmit the location data or a calculated location to a receiver interested in the location of the asset tracking device.

SUMMARY

In an embodiment described herein, a method for asset transportation verification is provided. The method comprises detecting a trigger for asset transportation verification; tracking one or more first asset location updates of a first asset tracking device; tracking one or more second asset location updates of a second asset tracking device; determining, responsive to the trigger, whether the second asset tracking device is co-located with the first asset tracking device based upon the one or more first asset location updates and the one or more second asset location updates; generating an alert in response to determining the first asset tracking device is not co-located with the second asset tracking device.

In another embodiment described herein, a tracking server is provided. The tracking server comprises a memory and a processor coupled to the memory. The processor is configured to detect a trigger for asset transportation verification; track one or more first asset location updates of a first asset tracking device; track one or more second asset location updates of a second asset tracking device; determine, responsive to the trigger, whether the second asset tracking device is co-located with the first asset tracking device based upon the one or more first asset location updates and the one or more second asset location updates; generate an alert in response to determining the first asset tracking device is not co-located with the second asset tracking device.

BRIEF DESCRIPTION OF THE DRAWINGS

The present disclosure will be better understood with reference to the drawings, in which.

DETAILED DESCRIPTION

Figure 1:
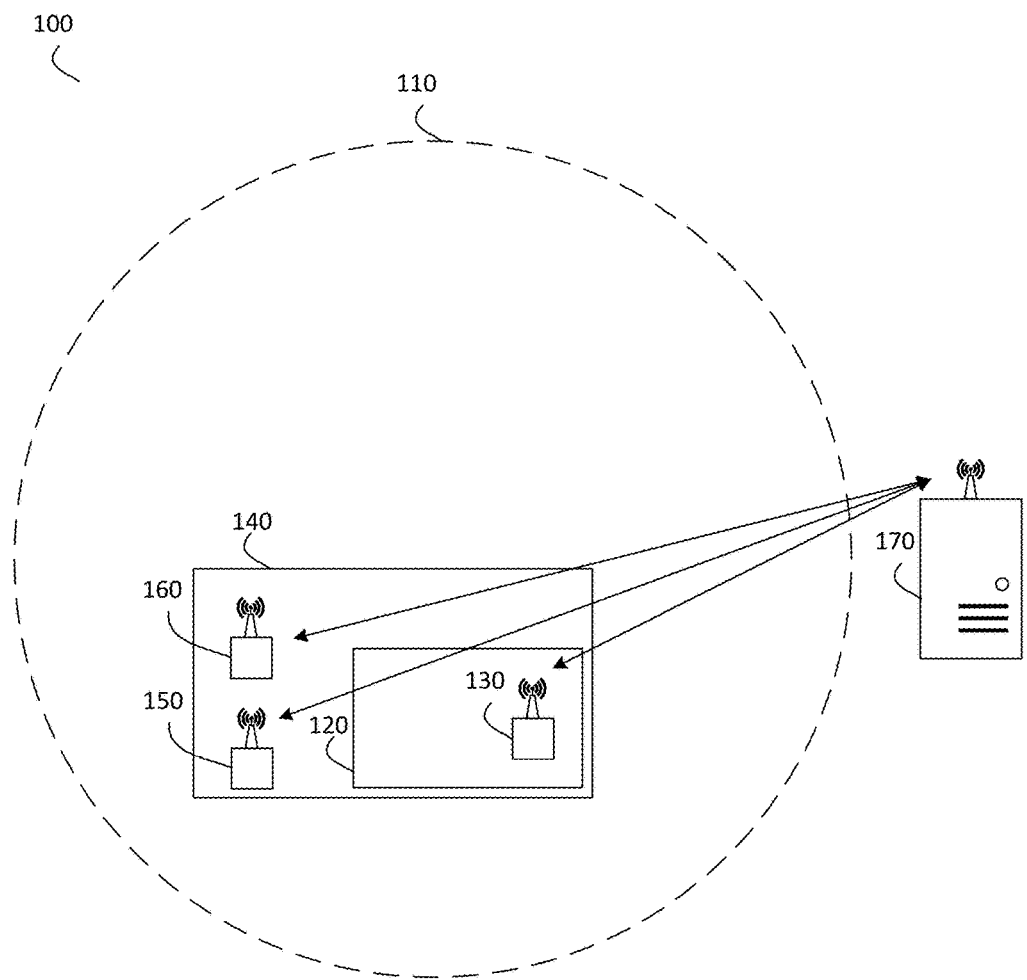
FIG. 1 is a diagram of an embodiment of a system for asset tracking.

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, cargo is assigned to a vehicle for transportation to a destination. Occasionally, a shipment is loaded onto the wrong vehicle, for example, a vehicle destined for a destination different than the desired destination of the cargo. Sometimes the mistake is not recognized until after arrival at the incorrect destination for the cargo. Transporting the cargo to an incorrect destination results in shipping delays and additional shipping costs. It is desirable to quickly detect that cargo has been loaded on a vehicle to which the cargo is not assigned, or to identify errors that mean the cargo is not traveling to the desired destination.

Described herein are systems and methods for determining whether a first asset is co-located with a second asset for transport. A first asset tracking device is attached to, for example, a container or some other cargo and transmits location updates to a tracking server or system. A second asset tracking device is attached to or integrated with, for example, a vehicle or mobile device and also transmits location updates to the tracking server or system. In some cases, all or a portion of the functionality of the tracking server or system is integrated with the vehicle or mobile device. In response to a trigger event, the location updates from the first asset device and second asset device are compared to determine whether the container or other cargo is co-located with the vehicle or mobile device.

The term "co-located", as used herein, indicates that there is some relationship or connection between the location of the container or other cargo and the location of the vehicle or mobile device. It encompasses when both the container or other cargo and the vehicle or mobile device are reporting substantially the same location, and also encompasses when the container or other cargo and the vehicle or mobile device are reporting or following a similar path. In an example of a cargo travelling by train, the cargo may be a mile behind the engine but following a similar path. In a large cargo ship, the container or other cargo and the vehicle or mobile device may report locations that differ by several meters, yet since they are co-located they follow a similar path.

The term "asset" as used herein encompasses a single item, for example a vehicle, as well as any container or vessel housing or supporting a plurality of cargo or items, for example heavy equipment, tools, or machinery. The term "asset" may also encompass a driver or operator of a vehicle. The term "vehicle" may include, for example, a wheeled vehicle, train, plane, or ship. Cargo is a type of asset and may include, but is not limited to, shipping containers, trailers, pallets, or other packaging of goods, or the goods or items themselves. Other types of assets may be tracked using an asset tracking device as described herein and are all within the spirit and scope of the present disclosure.

An asset tracking device may be any apparatus or computing device that is capable of providing data or information from sensors or receivers associated with the asset tracking device to a monitoring system. Sensors or receivers associated with the tracking device may either be physically part of the asset tracking device, or may be associated with the asset tracking device through short range wired or wireless communications.

FIG. 1 is a diagram of an embodiment of a system 100 for asset tracking. Pickup area 110 may be, for example, a train station, truck depot, port, airport, etc. Pickup area 110 may be encompassed by a geofence. Geofences may be used for fleet tracking and management. A geofence is determined with reference to boundaries of a geographical area. Location data from an asset tracking device, is compared with coordinate ranges of the geofence to determine whether the asset tracking device is inside or outside the geofence. Shipping companies often maintain geofences around important places, including but not limited to storage yards, client sites, maintenance sites, rest areas, among others for purposes of, for example, site security and management. When a vehicle, shipping container, or some other asset enters or exits a geofenced area, alerts can be provided and logs created.

Cargo 120 may be loaded onto a vehicle 140 at the pickup area 110. The cargo 120 may have a first asset tracking device 130 attached thereto. The first asset tracking device 130 may communicate with a tracking server 170 for tracking the location of the cargo 120.

The vehicle 140 may include a second asset tracking device 150. The second asset tracking device 150 may communicate with the tracking server 170. A third asset tracking device 160 may also be present in the vehicle 140. The third asset tracking device 160 may be a mobile device carried by a driver or operator of vehicle 140. In some embodiments, only one of the second asset tracking device 150 or the third asset tracking device 160 may be present in the system 100. In these embodiments, the first asset tracking device 130 is used to determine the location of the cargo 120, while either the second asset tracking device 150 associated with the vehicle 140 or the third asset tracking device 160 associated with a mobile device is used to determine the location of the vehicle 140 or an operator or driver of the vehicle 140. In some embodiments, more than three asset tracking devices may be used in determining co-location. For example, a flatbed could carry three pieces of heavy equipment. The flatbed could be attached to a truck and driven by a driver with a mobile device and operator with a mobile device needed to operate the heavy equipment. In this example, seven asset tracking devices may be present the system. The system may determine whether all seven assets are co-located in order to ensure that the correct heavy equipment and operator of the heavy equipment are on the right flatbed pulled by the correct truck driven by the assigned driver.

The first asset tracking device 130, second asset tracking device 150, and third asset tracking device 160 take location measurements at periodic intervals, in real-time, or based on some other predetermined event. The first asset tracking device 130, second asset tracking device 150, and third asset tracking device 160 may take location measurements at different intervals relative to one another. For example, the first asset tracking device 130 may take location measurements at, for example, ten minute intervals, and the second asset tracking device 150 may take location measurements at, for example, five minute intervals. Each of the first asset tracking device 130, second asset tracking device 150, and third asset tracking device 160 transmits location measurements or other location information to the tracking server 170 and/or to each other.

The tracking server 170 may be any computer server or combination of servers that are remote from the first asset tracking device 130. The tracking server 170 is configured to receive data from a plurality of asset tracking devices. In some embodiments, the functionality of the tracking server 170 may be implemented in the second asset tracking device 150, or the third asset tracking device 160.

The first asset tracking device 130, second asset tracking device 150, and third asset tracking device 160 may communicate through a cellular base station or through an access point. Access points may be any wireless communication access point. For example, a public or private WiFi router or router network. Communication may then proceed over a local area network or wide area network such as the Internet and proceed to tracking server 170. In other embodiments, any of the first asset tracking device 130, second asset tracking device 150, and third asset tracking device 160 may communicate through satellite communication or other radio technologies. For example, if the first asset tracking device 130, second asset tracking device 150, and third asset tracking device 160 are travelling to areas that are outside of cellular coverage or access point coverage, satellite communication or other radio technology may be used. Communication between the first asset tracking device 130, second asset tracking device 150, third asset tracking device 160, and tracking server 170 may be one directional or bidirectional.

At some point, either the first asset tracking device 130 associated with the cargo 120 or the second asset tracking device 150 and third asset tracking device 160 associated with the vehicle 140 departs the pick up area 110. Departing the pickup area 110 by any of the first asset tracking device 130, the second asset tracking device 150, or the third asset tracking device 160 may be considered a trigger event. A trigger event prompts the tracking server 170 to determine whether the first asset tracking device 130 and cargo 120 are co-located with and being carried by the vehicle 140. FIG. 1 includes a trigger event of exiting the pickup area 110 or geofence. Other trigger events may be used alone or in combination with exiting of the pickup area 110 to trigger the system 100. Trigger events may include an estimated time of departure; movement of the first asset tracking device 130, second asset tracking device 150, or third asset tracking device 160; the first asset tracking device 130, second asset tracking device 150, or third asset tracking device 160 departing the pickup area 110; detecting a change of some sensor connected to the first asset tracking device 130, second asset tracking device 150, or third asset tracking device 160, for example, a door closing or opening; an update received by the tracking server 170 from a user, for example a driver or dispatcher, at the pickup area 110; and other actions that may be measured or received to determine whether the cargo 120 is co-located with and being carried by the vehicle 140.

After detecting a trigger event, the tracking server 170 may determine whether the cargo 120 is co-located with and being carried by the vehicle 140, and in some cases whether the correct driver is co-located with the cargo 120 and vehicle 140, based upon location updates received from two or more of the first asset tracking device 130, second asset tracking device 150, and third asset tracking device 160. The first asset tracking device 130 reports the location of the cargo 120 to tracking server 170. In an embodiment, a driver may be assigned to drive vehicle 140 to transport cargo 120. In this embodiment, the tracking server 170 compares updates from the first asset tracking device 130 associated with the cargo 120, the second asset tracking device 150 associated with the vehicle 140, and the third asset tracking device 160 associated with the driver (not pictured). The location updates for determining co-location may be, for example, a predetermined quantity of location updates equal to five updates. The quantity of location updates may vary based upon various factors including, but not limited to, the reliability of location measurements provided by the first asset tracking device 130, second asset tracking device 150, or third asset tracking device 160, the environment of the vehicle 140 route, or a confidence level of the determined co-location based on the location updates. As the number of location updates increase, if the asset tracking devices are co-located the confidence level will increase, and if the asset tracking devices are not co-located the confidence level will decrease.

Determining whether the cargo 120 is co-located with the vehicle 140 may be accomplished in a number of ways. For example, the tracking server 170 receives location updates from the first asset tracking device 130 and the second asset tracking device 150. Based on the received location updates, the tracking server 170 may generate a route taken by the first asset tracking device 130 and a route taken by the second asset tracking device 150. If the two routes are outside of a threshold distance of each other, the tracking server 170 may determine the vehicle 140 and cargo 120 are not co-located. If the two routes are within the threshold distance of each other, the tracking server 170 may determine the vehicle 140 and cargo 120 are co-located.

In another example, the tracking server 170 compares a location of the first asset tracking device 130 and the second asset tracking device 150 at one or more discrete points (geographic locations/co-ordinates) in time. Depending upon the frequency of location updates received, the tracking server 170 may interpolate or extrapolate the location of the first asset tracking device 130 or the second asset tracking device 150 at the one or more points in time based on the received location updates. For example, the first asset tracking device 130 may transmit updates at five minute intervals, while the second asset tracking device 150 may transmit location updates at ten minute intervals. The tracking server 170 receives a location update from the first asset tracking device 130 at fifteen minutes after the trigger event and interpolates the location of the second asset tracking device 150 at fifteen minutes after the trigger event based on a location update received at ten minutes and a location update received at twenty minutes. The tracking server 170 subsequently determines whether the location of the points are within the threshold distance of each other. If the points are outside of a threshold distance of each other, the tracking server 170 may determine the vehicle 140 and cargo 120 are not co-located. If the points are within the threshold distance of each other, the tracking server 170 may determine the vehicle 140 and cargo 120 are co-located.

In another example, the tracking server 170 determines, based on the location updates, that one of the first asset tracking device 130 or the second asset tracking device 150 is in motion while the other of the first asset tracking device 130 and the second asset tracking device 150 is not in motion. If one is in motion while the other is not in motion, the tracking server 170 may determine that the cargo 120 and vehicle 140 are not co-located. The term "in motion" may be a determination that the asset tracking device has departed a start location, and the location updates showing the asset as travelling away from the start location. "In motion" could also be determined by sensor readings for example from an accelerometer. A determination of being "in motion" could cover sensor readings and subsequent location updates showing the asset travelling away from the start location.

In yet another example, the tracking server determines, based on the location updates, that one of the first asset tracking device 130 or the second asset tracking device 150 has departed the pickup location 110 while the other of the first asset tracking device 130 and the second asset tracking device 150 has not departed the pickup location 110. If one has departed the pickup location 110 while the other has not departed the pickup location 110, the tracking server 170 may determine that the cargo 120 and vehicle 140 are not co-located.

Each of the preceding examples may be used alone or in combination for determining co-location. For example, the tracking server 170 may typically wait for five location updates from the first asset tracking device 130 and the second asset tracking device 150 before determining the routes for co-location determination. The tracking server 170 may also simultaneously monitor whether or not the first asset tracking device 130 and the second asset tracking device 150 are in motion. If the tracking server 170 determines that either the first asset tracking device 130 or the second asset tracking device 150 is in motion while the other is not, the tracking server 170 may determine that the first asset tracking device 130 and the second asset tracking device 150 are not co-located prior to receiving the five location updates from the first asset tracking device 130 or the second asset tracking device 150.

Each of the preceding examples may be accomplished based on two or more asset tracking devices. In some embodiments, location updates from more than two asset tracking devices may be considered while determining co-location. For example, a third asset tracking device 160 may also provide location updates. A third route may be generated based on the location updates from the third asset racking device 160 and compared to the first two routes. In the alternative, locations from the third asset tracking device 160 may be compared to locations of the first asset tracking device 130 and second asset tracking device 150. Thus, the foregoing examples may be used to determine whether the correct driver associated with the third asset tracking device 160 is driving the correct vehicle 140 associated with the second asset tracking device 150 with the correct cargo 120 associated with the first asset tracking device 130 by comparing location updates from each of the asset tracking devices 130, 150, and 160.

The quantity of location updates for determining whether the cargo 120 is co-located with the vehicle 140 may vary based upon various factors including, but not limited to, a confidence level of the location updates, the reliability of location measurements provided by the first asset tracking device 130, the second asset tracking device 150, or the third asset tracking device 160, or the environment of the route traveled by vehicle 140.

If the tracking server 170 determines that the cargo 120 is not co-located with the vehicle 140 after the trigger event, an alert may be transmitted to one or more of a mobile device of a driver, for example the third asset tracking device 160, a communication system in vehicle 140, a dispatcher, or any other interested party. If the tracking server 170 determines that the cargo 120 is co-located with the vehicle 140 after the trigger event, a confirmation message may be transmitted to confirm the co-location.

In some embodiments, the functionality of the tracking server 170 may be integrated with one of the first asset tracking device 130, second asset tracking device 150, or third asset tracking device 160. In these embodiments, a tracking server 170 may not be present in the system 100 and communication of location updates and alerts may occur between the first asset tracking device 130, second asset tracking device 150, and/or third asset tracking device 160. In some embodiments, more than one tracking server may be present in the system. For example, each of the first asset tracking device 130, second asset tracking device 150, or third asset tracking device 160 may communicate location updates to a respective tracking server and those respective servers may then communicate the location updates to a central server used for determining co-location. Alternatively, one or more of the tracking servers may communicate the location updates received from their respective asset tracking devices to another one of the tracking servers, without a further central server being required.

Figure 2:
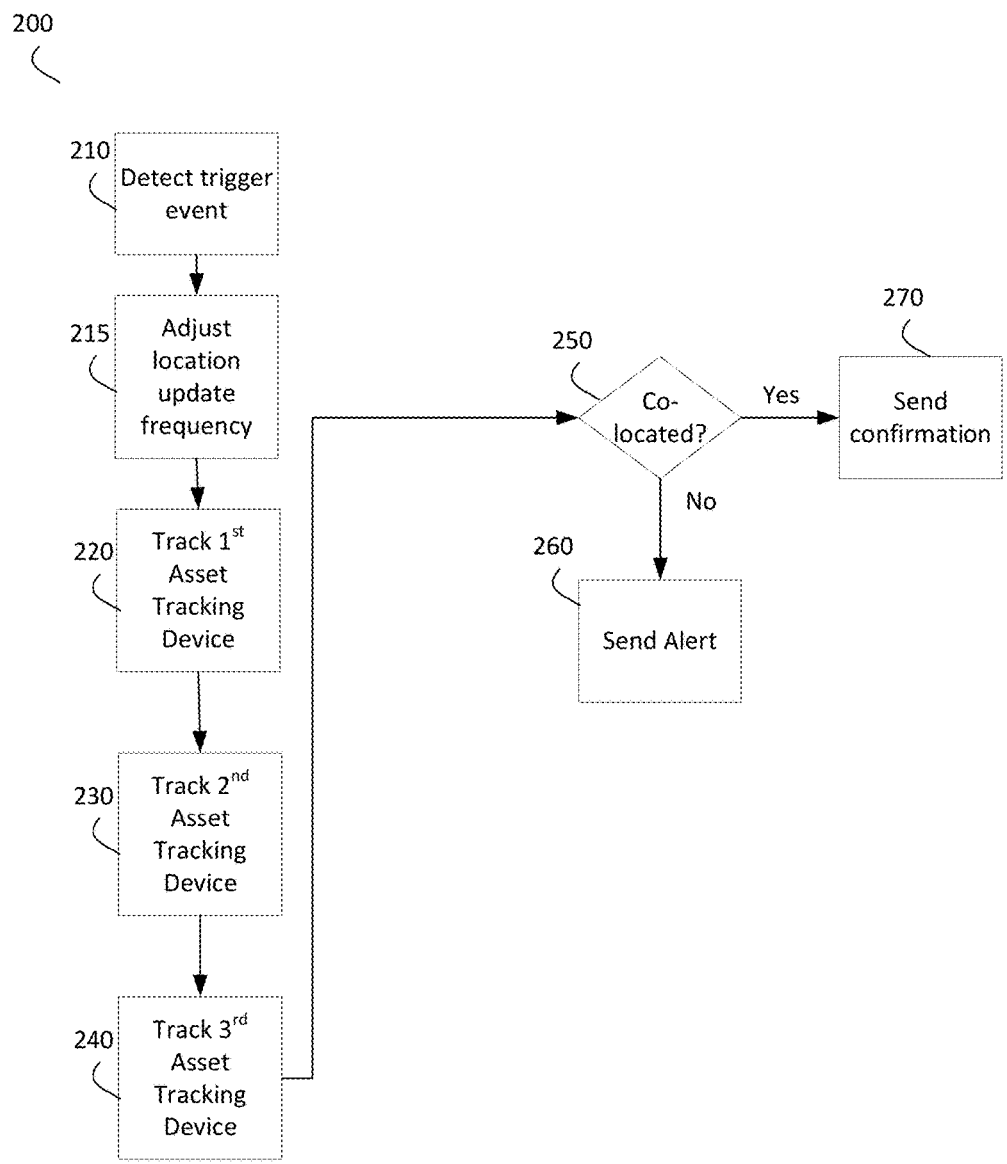
FIG. 2 is a flow diagram of an embodiment of a method for asset tracking.

FIG. 2 is a flow diagram of an embodiment of a method 200 for asset tracking. The method 200 begins at step 210 when a trigger event is detected by a tracking server, for example, tracking server 170. The trigger event may be detected directly by the tracking server, or detected via an asset tracking device, for example first asset tracking device 130, second asset tracking device 150, or third asset tracking device 160. A trigger event may occur based on an estimated time of departure for cargo, for example cargo 120, or a vehicle, for example vehicle 140, from a pickup location, for example pickup location 110. Other trigger events as described herein may cause the tracking server to determine whether the cargo is co-located with the vehicle.

Optionally, at step 215, the frequency of location updates generated by the asset tracking devices may be adjusted. The tracking server may transmit an instruction to one or more of the asset tracking devices to adjust the frequency of location updates. The frequency of location updates may be synchronized such that location updates are transmitted substantially simultaneously. The frequency of location updates may be increased such that a co-location determination can be made more quickly. This may be used when a threshold number of location updates is needed for determining co-location. After a co-location determination, the asset tracking devices may return to their normal frequency of location updates. Returning to the normal frequency may be based upon a message received from a tracking server, the expiration of a timer, transmission of a certain number of location updates, or some other condition. In an embodiment, the asset tracking device may not be configured to receive instructions from the tracking server. In this embodiment, the tracking server may synchronize the timing/frequency of location updates of those asset tracking devices which are configured to receive instructions to coincide with the timing/frequency of the location updates from those asset tracking devices that are not configured to or able to receive instructions from the tracking server.

At step 220, the tracking server may track a first asset tracking device, for example asset tracking device 130, associated with the cargo to be transported. At step 230, the tracking server may track a second asset tracking device, for example asset tracking device 150. The second asset tracking device may be associated with a vehicle, for example, vehicle 140, or may be associated with a mobile device of the driver of the vehicle, for example, a smartphone or other mobile device carried by the driver. Optionally, at step 240, the tracking server may track a third asset tracking device, for example asset tracking device 160. The third asset tracking device may be associated with the vehicle or may be associated with the mobile device of the driver of the vehicle.

At step 250, the tracking server may determine if the cargo is co-located with either or both of the vehicle or driver using one or more of the techniques described herein. In some embodiments, determining that the cargo is not co-located may occur faster than determining that the cargo is co-located. For example, determining movement of one asset and non-movement of another asset may be faster than determining two routes and comparing the determined routes to determine co-location. If the cargo is not co-located with the vehicle or driver, an alert may be sent at step 260. The alert may be sent to the driver, the vehicle, a dispatcher, or some other interested party. The method may begin again from step 210 if the driver and/or vehicle return to the pickup location. Optionally, if the cargo is co-located with the driver or vehicle, a confirmation message may be sent at step 270. The confirmation message may be sent to the driver, the vehicle, a dispatcher, or some other interested party.

Figure 3:
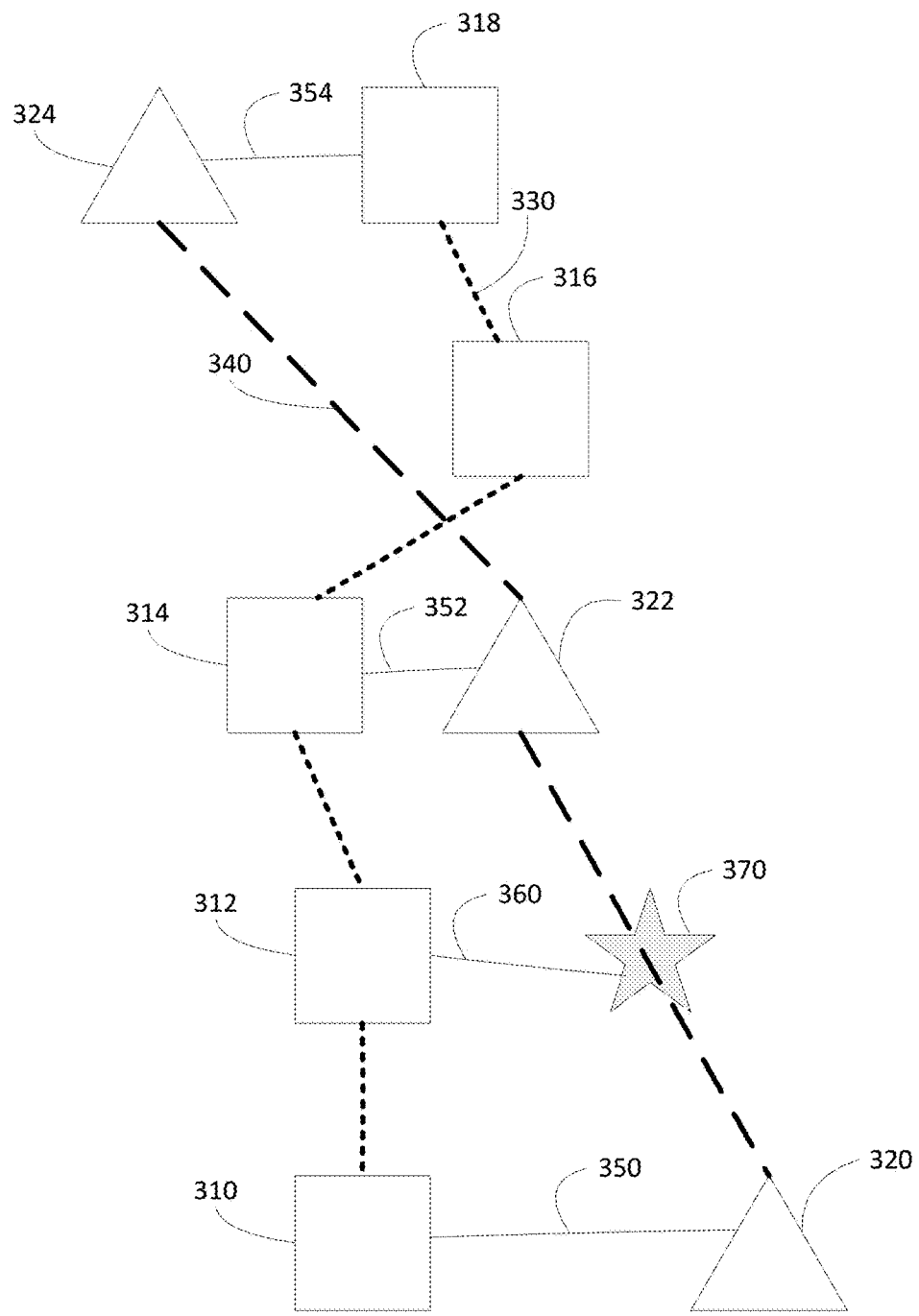
FIG. 3 is a diagram of an embodiment of a location mapping for determination of whether cargo is co-located with a second asset.

FIG. 3 is diagram of an embodiment of a location mapping for determination of whether cargo is co-located with a second asset. Location updates received from a first asset tracking device are indicated by a square. Location updates received from a second asset tracking device are indicated by a triangle. An interpolated location is indicated by a star. FIG. 3 depicts a scenario where the first asset tracking device and the second asset tracking device are determined to be co-located. Following a trigger event, a tracking server receives a plurality of location updates from a first asset tracking device associated with a mobile device and a second asset tracking device associated with cargo. In other embodiments, the first asset tracking device may be associated with a vehicle or other transportation device. In other embodiments, the second asset tracking device may be associated with a container or some other item or items to be transported. The location updates from the first asset tracking device are transmitted at a period of, for example, once per five minutes. The location updates from the second asset tracking device are transmitted at a period of, for example, once per ten minutes. Other update periods may be used to send the location updates. Shortly after the trigger event, the tracking server receives location update 310 from the first asset tracking device and location update 320 from the second asset tracking device. Approximately five minutes after the trigger event, the tracking server receives location update 312 from the first asset tracking device. Approximately ten minutes after the trigger event, the tracking server receives location update 314 from the first asset tracking device and location update 322 from the second asset tracking device. Approximately fifteen minutes after the trigger event, the tracking server receives location update 316 from the first asset tracking device. Approximately twenty minutes after the trigger event, the tracking server receives location update 318 from the first asset tracking device and location update 324 from the second asset tracking device. The received location updates may be stored in a memory of the tracking server for use in determining whether the cargo is co-located with the driver.

The tracking server may calculate a route 330 connecting the location updates from the first asset tracking device and a route 340 connecting the location updates from the second asset tracking device. Route 330 and route 340 may be calculated using straight or curved lines between each of the location updates. In some embodiments, the tracking server may have access to mapping information. The tracking server may use the received location updates and the mapping information to calculate route 330 and route 340.

After the routes are calculated, the tracking server may compare the routes. The route 330 and the route 340 may be compared as a whole or in part. For example, the tracking server determines distances 350, 352, and 354 at times zero, ten minutes, and twenty minutes respectively. If the distances 350, 352, and 354 are less than a threshold distance, the cargo is determined to be co-located with the driver. Alternatively, one or more points (determined or received location coordinates) along one of route 330 or route 340 may be compared with one or more estimated points which are interpolated between two points (determined or received location coordinates) on the other of route 330 or route 340. For example, the tracking server may interpolate or extrapolate a point 370 between location updates 320 and 322 at approximately five minutes after the trigger event. The distance 360 between the point 370 and location update 312 received at approximately five minutes after the trigger event is then used in determining whether the cargo is co-located with the driver. When distances between received or determined points (discrete points) are used for determining co-location, the route 330 and the route 340 may not need to be calculated. With regards to the location updates of FIG. 3, distance 350, 352, 354, and 360 may all be less than the threshold distance. Thus, the first asset tracking device and the second asset tracking device may be determined to be co-located. In another embodiment, other methods may be used to determine whether the routes are co-located. For example, the area between route 330 and route 340 may be calculated. The area may then be divided by the length of either route 330 or route 340. If the result is less than a threshold value, the first asset tracking device and the second asset tracking device may be determined to be co-located.

Figure 4:
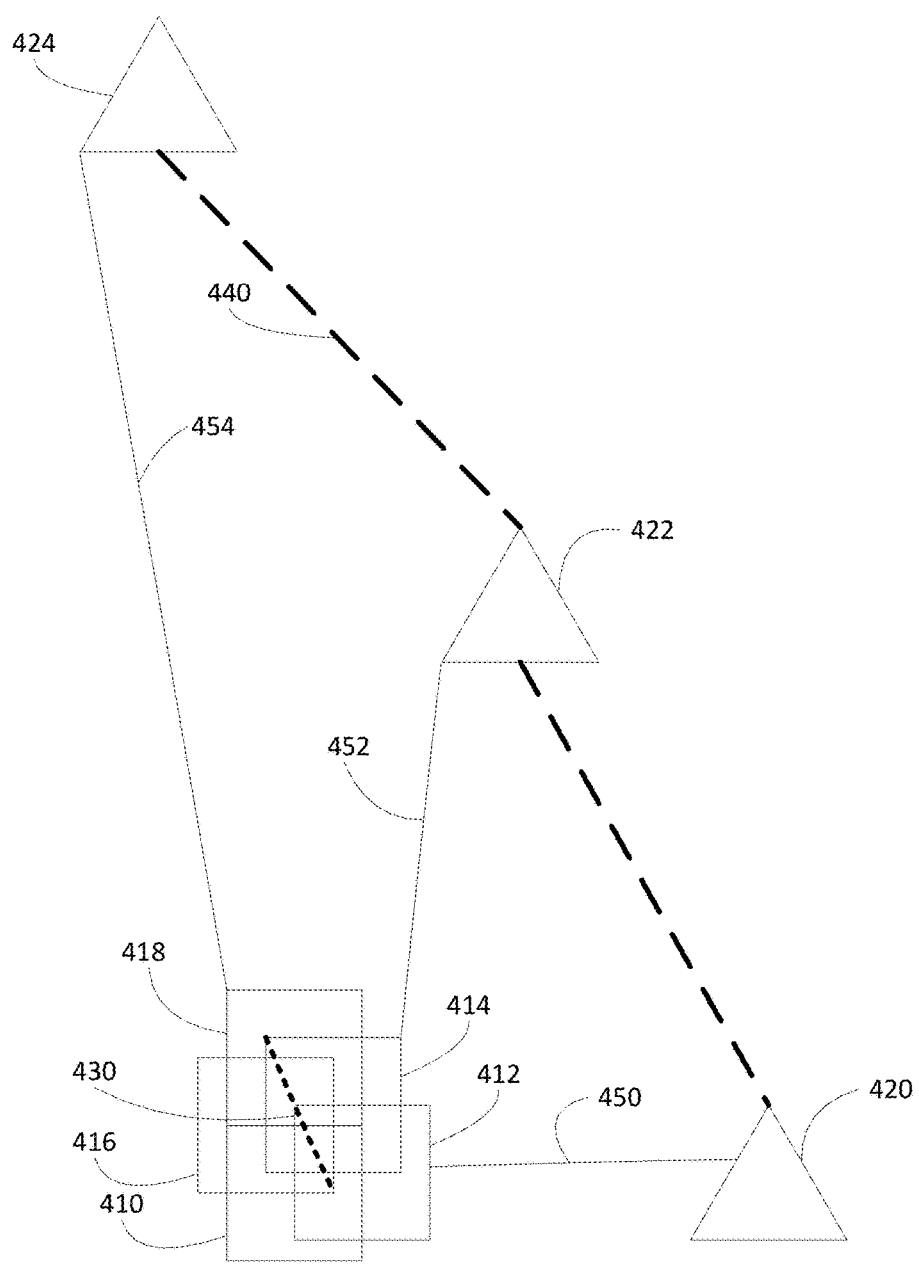
FIG. 4 is a diagram of an embodiment of a location mapping for determination of whether cargo is co-located with a second asset.

FIG. 4 is a diagram of an embodiment of a location mapping for determination of whether cargo is co-located with a second asset. Location updates received from a first asset tracking device are indicated by a square. Location updates received from a second asset tracking device are indicated by a triangle. FIG. 4 depicts a scenario where the first asset tracking device and the second asset tracking device are determined to not be co-located. In this scenario, the first asset is not moving and so the location updates are all generally within the same location, and the representative squares are overlapping. Following a trigger event, a tracking server receives a plurality of location updates from a first asset tracking device associated with a driver's mobile device and a second asset tracking device associated with cargo. In other embodiments, the first asset tracking device may be associated with a vehicle or other transportation device. In other embodiments, the second asset tracking device may be associated with a container or some other item or items to be transported. The location updates from the first asset tracking device are transmitted at a period of, for example, once per five minutes. The location updates from the second asset tracking device are transmitted at a period of, for example, once per ten minutes. Other update periods may be used to send the location updates. Shortly after the trigger event, the tracking server receives location update 410 from the first asset tracking device and location update 420 from the second asset tracking device. Approximately five minutes after the trigger event, the tracking server receives location update 412 from the first asset tracking device. Approximately ten minutes after the trigger event, the tracking server receives location update 414 from the first asset tracking device and location update 422 from the second asset tracking device. Approximately fifteen minutes after the trigger event, the tracking server receives location update 416 from the first asset tracking device. Approximately twenty minutes after the trigger event, the tracking server receives location update 418 from the first asset tracking device and location update 424 from the second asset tracking device. The received location updates may be stored in a memory of the tracking server for use in determining whether the cargo is co-located with the driver.

The tracking server may calculate a route 430 connecting the location updates from the first asset tracking device and a route 440 connecting the location updates from the second asset tracking device. Route 430 and route 440 may be calculated using straight or curved lines between each of the location updates. In some embodiments, the tracking server may have access to mapping information. The tracking server may use the received location updates and the mapping information to calculate route 430 and route 440.

After the routes are calculated, the tracking server may compare the routes. The route 430 and the route 440 may be compared as a whole. For example, the tracking server may determine distances 450, 452, and 454 at times zero, ten minutes, and twenty minutes respectively. If one or more of the distances 450, 452, and 454 are greater than a threshold distance, the cargo is determined to not be co-located with the driver and an alert may be sent. Alternatively, one or more points (determined or received location coordinates) along one of route 430 or route 440 may be compared with one or more estimated points which are interpolated between two points (determined or received location coordinates) on the other of route 430 or route 440. With regards to FIG. 4, distance 450 may be less than the threshold distance, and distances 452 and 454 are greater than the threshold distance. Thus, the first-asset tracking device and the second asset tracking device are not co-located.

The location updates may be pushed from the asset tracking devices to the tracking server, pulled from the asset tracking device by the tracking server, or transmitted on demand by either the asset tracking device or the tracking server.

Figure 5:
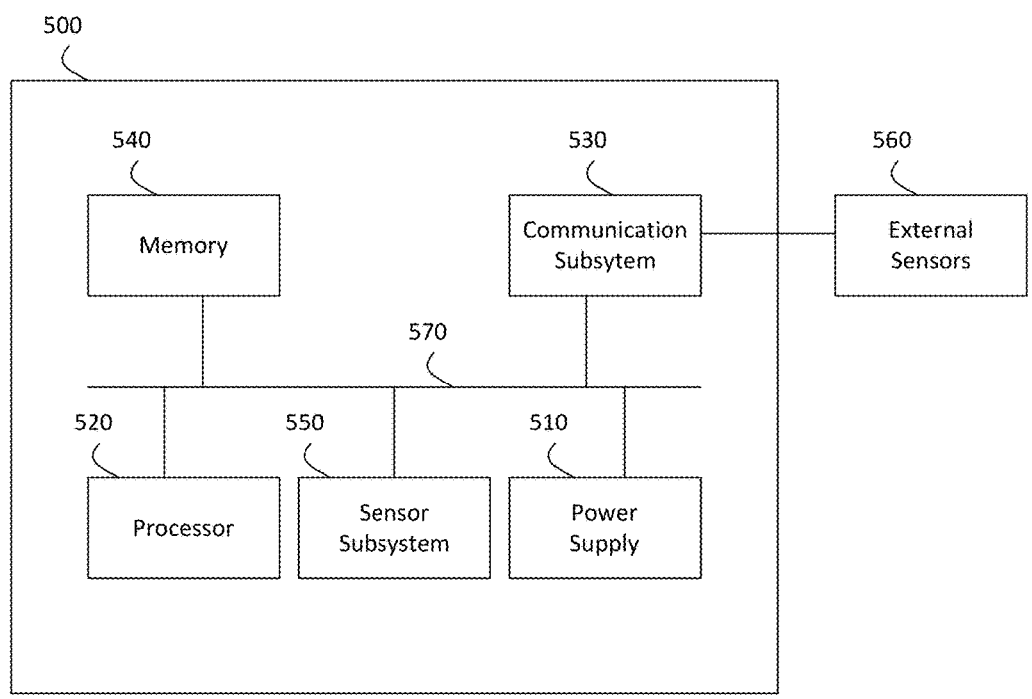
FIG. 5 is a diagram of an embodiment of a tracking device.

FIG. 5 is a diagram of an embodiment of a tracking device 500. The first asset tracking device 130, second asset tracking device 150, or third asset tracking device 160 may include features of tracking device 500. Tracking device 500 may include a power supply 510, processor 520, communications subsystem 530, memory 540, and sensor subsystem 550. The components of tracking device 500 may communicate via bus 570. Tracking device 500 may be a standalone device or may be included as part of a larger apparatus, for example, tracking device 500 may be integrated into a vehicle's subsystems or a mobile device. The processor 520 and communications subsystem 530 may cooperate to perform the methods of the embodiments described herein. Communications subsystem 530 may, in some embodiments, comprise multiple subsystems, for example for different radio technologies. Communications subsystem 530 enables tracking device 500 to communicate with other devices or network elements.

Communications subsystem 530 may use one or more of a variety of communication types, including but not limited to cellular, satellite, Bluetooth™ Bluetooth™ Low Energy, Wi-Fi, wireless local area network (WLAN), near field communications (NFC), ZigBee, wired connections such as Ethernet or fiber, among other options. As such, a communications subsystem 530 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communications subsystem 530 will be dependent upon the communication network or communication technology on which the sensor apparatus is intended to operate.

If communications subsystem 530 operates over a cellular connection, a subscriber identity module (SIM) (not pictured) may be provided to allow such communication. A SIM may be a physical card or may be virtual. In some embodiments the SIM may also be referred to as a universal subscriber identity module (USIM), as merely an identity module (IM), or as an embedded Universal Integrated Circuit Card (eUICC), among other options.

Processor 520 generally controls the overall operation of the tracking device 500 and is configured to execute programmable logic, which may be stored, along with data, using memory 540. Memory 540 can be any tangible, non-transitory computer readable storage medium, including but not limited to optical (for example, compact disk (CD), digital video disc (DVD), etc.), magnetic (for example, tape), flash drive, hard drive, or other types of memory.

Alternatively, or in addition to memory 540, tracking device 500 may access data or programmable logic from an external storage medium, for example through communications subsystem 530. In the embodiment of FIG. 5, tracking device 500 may utilize one or a plurality of sensors, which may either be part of tracking device 500 or may be external to and communicate with tracking device 500. Processor 520 may receive input from a sensor subsystem 550. Sensor subsystem 550 may provide information including, but not limited to, information concerning the current location of the tracking device 500, the temperature inside a shipping container or trailer that the tracking device 500 is connected to, whether the doors on the shipping container or trailer are closed, whether a sudden acceleration or deceleration event has occurred, the tilt angle of the trailer or shipping container, among other data.

Examples of sensors that may be included in sensor subsystem 550 include a positioning sensor, a Radar, a Light Detection and Ranging (LIDAR) sensor, one or more image sensors, an accelerometer, light sensors, gyroscopic sensors, a thermometer, a hygrometer, and other sensors. Other sensors may be any sensor that is capable of reading or obtaining data that may be useful for tracking device 500. However, the described sensors are merely examples, and in other embodiments different sensors or a subset of sensors may be used. For example, in one embodiment of the present disclosure, only a positioning sensor is provided.

The positioning sensor may use a positioning subsystem such as a Global Navigation Satellite System (GNSS) receiver which may be, for example, a Global Positioning Systems (GPS) receiver (for example, in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia, and South Korea, Russia's GLONASS system, India's proposed Regional Navigational Satellite System (IRNSS), Japan's proposed QZSS regional system, and others.

Another sort of positioning subsystem may be used as well, for example a radiolocation subsystem that determines its current location using radiolocation techniques. In other words, the location of the device can be determined using triangulation of signals from in-range base towers, such as used for Wireless Enhanced 911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Sensors may also be external to tracking device 500 and communicate with tracking device 500, for example through communications subsystem 530. Such sensors are shown as external sensors 560. External sensors 560 may have similar features and capabilities of the sensor subsystem 550. For example, external sensors 560 may include external location monitoring sensors that communicate with tracking device 500 using Bluetooth™ Low Energy. Other external sensors and communication methods are possible.

Further, the tracking device 500 may, in some embodiments, act as a gateway, and may communicate with other tracking devices (not shown), where the other tracking devices may act as hubs for a subset of the sensors.

Communications between the various elements of tracking device 500 may be through an internal bus 570 in one embodiment. However, other forms of communication are possible.

Tracking device 500 may be affixed to any fixed or portable platform. For example, tracking device 500 may be affixed to shipping containers, truck trailers, truck cabs, or other vehicles or cargo.

Power supply 510 may be a battery or other rechargeable type power supply. The power supply 510 may be recharged by an external power source. Recharging methods may include connecting to an external power source, as well as other power sources, such as, but not limited to, solar, electromagnetic, acoustic or vibration charging.

A tracking server may be any type of computer, server, or network node. For example, a server that may perform the embodiments described above is provided with regards to FIG. 6.

Figure 6:
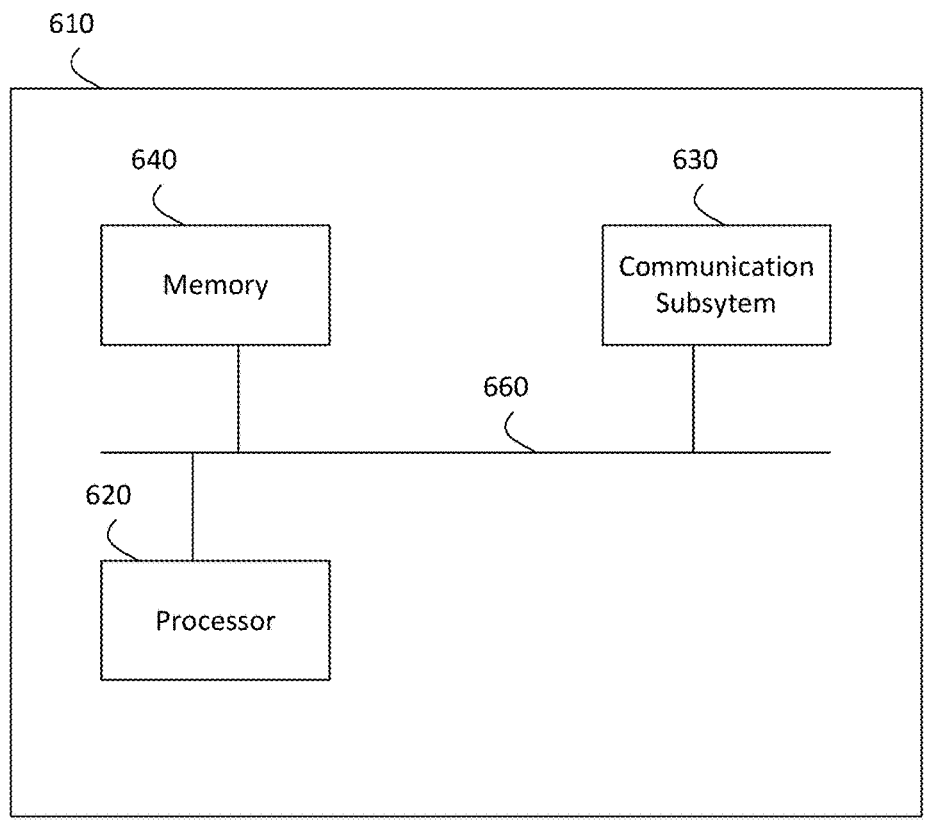
FIG. 6 is a diagram of an embodiment of a server for asset tracking.

In FIG. 6, server 610 includes a processor 620 and a communications subsystem 630, where the processor 620 and communications subsystem 630 cooperate to perform the methods of the embodiments described herein.

The processor 620 is configured to execute programmable logic, which may be stored, along with data, on the server 610, and is shown in the example of FIG. 6 as memory 640. The memory 640 can be any tangible, non-transitory computer readable storage medium, such as optical (for example, CD, DVD, etc.), magnetic (for example, tape), flash drive, hard drive, or other types of memory. In one embodiment, processor 520 may also be implemented entirely in hardware and not require any stored program to execute logic functions. Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a CD or a DVD; or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution. Alternatively, or in addition to the memory 640, the server 610 may access data or programmable logic from an external storage medium, for example through the communications subsystem 630.

The communications subsystem 630 allows the server 610 to communicate with other devices or network elements. Communications subsystem 630 may include multiple subsystems, for example for different radio technologies. Communications subsystem 630 enables server 610 to communicate with other devices or network elements.

Communications subsystem 630 may use one or more of a variety of communication types, including but not limited to cellular, satellite, Bluetooth™ Bluetooth™ Low Energy, Wi-Fi, wireless local area network (WLAN), NFC, ZigBee, wired connections such as Ethernet or fiber, among other options. As such, a communications subsystem 630 for wireless communications will typically have one or more receivers and transmitters, as well as associated components such as one or more antenna elements, LOs, and may include a processing module such as a DSP. As will be apparent to those skilled in the field of communications, the particular design of the communications subsystem 630 will be dependent upon the communication network or communication technology on which the sensor apparatus is intended to operate.

If communications subsystem 630 operates over a cellular connection, a SIM (not pictured) may be provided to allow such communication. A SIM may be a physical card or may be virtual. In some embodiments the SIM may also be referred to as a USIM, as merely an IM, or as an embedded eUICC, among other options.

Communications between the various elements of the server 610 may be through an internal bus 660 in one embodiment. However, other forms of communication are possible.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

In particular, the present disclosure may include the embodiments of the following clauses.

AA. A method for asset transportation verification, the method comprising: detecting a trigger for asset transportation verification; tracking one or more first asset location updates of a first asset tracking device; tracking one or more second asset location updates of a second asset tracking device; determining, responsive to the trigger, whether the second asset tracking device is co-located with the first asset tracking device based upon the one or more first asset location updates and the one or more second asset location updates; generating an alert in response to determining the first asset tracking device is not co-located with the second asset tracking device.

BB. The method of clause AA, wherein the trigger comprises one or more of: the first asset tracking device or the second asset tracking device departing a pickup location; movement of the first asset tracking device or the second asset tracking device; an estimated time of departure; or a manual trigger.

CC. The method of clause AA or clause BB, wherein determining whether the second asset tracking device is co-located with the first asset tracking device comprises: calculating a first route based on the one or more first location updates; calculating a second route based on the one or more second location updates; and determining the second asset tracking device is not co-located with the first asset tracking device when a distance between corresponding points on the second route and first route exceeds a threshold distance.

DD. The method of clause CC, wherein the first route and the second route are further based on a known transportation route.

EE. The method of clause AA or clause BB, wherein determining whether the second asset tracking device is co-located with the first asset tracking device comprises: determining a distance between a first location update of the one or more first location updates and a second location update of the one or more second location updates; and determining the second asset tracking device is not co-located with the first asset tracking device when the distance exceeds a threshold distance.

FF. The method of clause AA or clause BB, wherein determining whether the second asset tracking device is co-located with the first asset tracking device comprises: determining whether the first asset tracking device is or is not in motion; determining whether the second asset tracking device is or is not in motion; determining the second asset tracking device is not co-located with the first asset tracking device when the first asset tracking device or the second asset tracking device is determined to be not in motion while the other of the first or second asset tracking device is determined to be in motion.

GG. The method of clause AA or clause BB, wherein determining whether the second asset tracking device is co-located with the first asset tracking device comprises: determining, based on the one or more first asset location updates, the first asset tracking device is located at a pickup location; determining, based on the one or more second location updates, that the second asset tracking device has departed the pickup location; and determining the second asset tracking device is not co-located with the first asset tracking device when the first asset tracking device is at the pickup location after the second asset tracking device has departed the pickup location.

HH. The method of clause AA or clause BB, wherein determining whether the second asset tracking device is co-located with the first asset tracking device comprises: determining, based on the one or more first asset location updates, the first asset tracking device has departed a pickup location; determining, based on the one or more second location updates, that the second asset tracking device has not departed the pickup location; and determining the second asset tracking device is not co-located with the first asset tracking device when the second asset tracking device has not departed the pickup location while the first asset tracking device has departed the pickup location.

II. The method of any one of clauses AA to HH further comprising generating a confirmation alert in response to determining the driver tracking device is co-located with the asset tracking device.

JJ. The method of any one of clauses AA to II further comprising: receiving one or more third asset location updates from a third asset tracking device; and determining, responsive to the trigger, whether the third asset tracking device is co-located with the second asset tracking device and the first asset tracking device based upon the one or more first asset location updates, the one or more second asset location updates, and the one or more third asset location updates.

KK. The method of any one of clauses AA to JJ, wherein tracking the one or more first location updates comprises receiving the one or more first location updates at a tracking server, and wherein tracking the one or more second location updates comprises receiving the one or more second location updates at the tracking server.

LL. The method of any one of clauses AA to JJ, wherein tracking the one or more first location updates comprises generating the one or more first location updates at a mobile device, and wherein tracking the one or more second location updates comprises receiving the one or more second location updates at the mobile device.

MM. A tracking server comprising: a memory; and a processor coupled to the memory, the processor configured to: detect a trigger for asset transportation verification; track one or more first asset location updates of a first asset tracking device; track one or more second asset location updates of a second asset tracking device; determine, responsive to the trigger, whether the second asset tracking device is co-located with the first asset tracking device based upon the one or more first asset location updates and the one or more second asset location updates; generate an alert in response to determining the first asset tracking device is not co-located with the second asset tracking device.

NN. The tracking server of clause MM, wherein the trigger comprises one or more of: the first asset tracking device or the second asset tracking device departing a pickup location; movement of the first asset tracking device or the second asset tracking device; an estimated time of departure; or a manual trigger.

OO. The tracking server of either clause MM or clause NN, wherein the processor configured to determine whether the second asset tracking device is co-located with the first asset tracking device comprises the processor configured to: calculate a first route based on the one or more first location updates; calculate a second route based on the one or more second location updates; and determine the second asset tracking device is not co-located with the first asset tracking device when a distance between corresponding points on the second route and first route exceeds a threshold distance.

PP. The tracking server of clause OO, wherein the first route and the second route are further based on a known transportation route.

QQ. The tracking server of either clause MM or clause NN, wherein the processor configured to determine whether the second asset tracking device is co-located with the first asset tracking device comprises the processor configured to: determine a distance between a first location update of the one or more first location updates and a second location update of the one or more second location updates; and determine the second asset tracking device is not co-located with the first asset tracking device when the distance exceeds a threshold distance.

RR. The tracking server of either clause MM or clause NN, wherein the processor configured to determine whether the second asset tracking device is co-located with the first asset tracking device comprises the processor configured to: determine whether or not the first asset tracking device is in motion; determine whether or not the second asset tracking device is in motion; determine the second asset tracking device is not co-located with the first asset tracking device when either the first asset tracking device or the second asset tracking device is determined to be not in motion while the other of the first asset tracking device or the second asset tracking device is determined to be in motion.

SS. The tracking server of either clause MM or clause NN, wherein the processor configured to determine whether the second asset tracking device is co-located with the first asset tracking device comprises the processor configured to: determine, based on the one or more first asset location updates, the first asset tracking device is located at a pickup location; determine, based on the one or more second location updates, that the second asset tracking device has departed the pickup location; and determine the second asset tracking device is not co-located with the first asset tracking device when the first asset tracking device is at the pickup location after the second asset tracking device has departed the pickup location.

TT. The tracking server of either clause MM or clause NN, wherein the processor configured to determine whether the second asset tracking device is co-located with the first asset tracking device comprises the processor configured to: determine, based on the one or more first asset location updates, the first asset tracking device has departed a pickup location; determine, based on the one or more second location updates, that the second asset tracking device has not departed the pickup location; and determine the second asset tracking device is not co-located with the first asset tracking device when the second asset tracking device has not departed the pickup location while the first asset tracking device has departed the pickup location.

UU. The tracking server of any one of clauses MM to TT, wherein the processor is further configured to generate a confirmation alert in response to determining the driver tracking device is co-located with the asset tracking device.

VV. The tracking server of any one of clauses MM to UU, wherein the processor is further configured to: receive one or more third asset location updates from a third asset tracking device; and determine, responsive to the trigger, whether the third asset tracking device is co-located with the second asset tracking device and the first asset tracking device based upon the one or more first asset location updates, the one or more second asset location updates, and the one or more third asset location updates.

What is claimed is:

1. A method for asset transportation verification, the method comprising:
    detecting a trigger for asset transportation verification;
    tracking one or more first asset location updates of a first asset tracking device;
    tracking one or more second asset location updates of a second asset tracking device;
    determining, responsive to the trigger, whether the second asset tracking device is co-located with the first asset tracking device based upon the one or more first asset location updates and the one or more second asset location updates; and
    generating an alert in response to determining the first asset tracking device is not co-located with the second asset tracking device.

2. The method of claim 1, wherein the trigger comprises one or more of:
    the first asset tracking device or the second asset tracking device departing a pickup location;
    movement of the first asset tracking device or the second asset tracking device;
    an estimated time of departure; or
    a manual trigger.

3. The method of claim 1, wherein determining whether the second asset tracking device is co-located with the first asset tracking device comprises:
    calculating a first route based on the one or more first asset location updates;
    calculating a second route based on the one or more second asset location updates; and
    determining the second asset tracking device is not co-located with the first asset tracking device when a distance between corresponding points on the second route and first route exceeds a threshold distance.

4. The method of claim 3, wherein the first route and the second route are further based on a known transportation route.

5. The method of claim 1, wherein determining whether the second asset tracking device is co-located with the first asset tracking device comprises:
    determining a distance between a first location update of the one or more first location updates and a second location update of the one or more second location updates; and
    determining the second asset tracking device is not co-located with the first asset tracking device when the distance exceeds a threshold distance.

6. The method of claim 1, wherein determining whether the second asset tracking device is co-located with the first asset tracking device comprises:
    determining whether the first asset tracking device is or is not in motion;
    determining whether the second asset tracking device is or is not in motion; and
    determining the second asset tracking device is not co-located with the first asset tracking device when the first asset tracking device or the second asset tracking device is determined to be not in motion while the other of the first or second asset tracking device is determined to be in motion.

7. The method of claim 1, wherein determining whether the second asset tracking device is co-located with the first asset tracking device comprises:
    determining, based on the one or more first asset location updates, the first asset tracking device is located at a pickup location;
    determining, based on the one or more second location updates, that the second asset tracking device has departed the pickup location; and
    determining the second asset tracking device is not co-located with the first asset tracking device when the first asset tracking device is at the pickup location after the second asset tracking device has departed the pickup location.

8. The method of claim 1, wherein determining whether the second asset tracking device is co-located with the first asset tracking device comprises:
    determining, based on the one or more first asset location updates, the first asset tracking device has departed a pickup location;
    determining, based on the one or more second location updates, that the second asset tracking device has not departed the pickup location; and
    determining the second asset tracking device is not co-located with the first asset tracking device when the second asset tracking device has not departed the pickup location while the first asset tracking device has departed the pickup location.

9. The method of claim 1 further comprising generating a confirmation alert in response to determining a driver tracking device is co-located with the first asset tracking device.

10. The method of claim 1 further comprising:
    receiving one or more third asset location updates from a third asset tracking device; and
    determining, responsive to the trigger, whether the third asset tracking device is co-located with the second asset tracking device and the first asset tracking device based upon the one or more first asset location updates, the one or more second asset location updates, and the one or more third asset location updates.

11. The method of claim 1, wherein tracking the one or more first location updates comprises receiving the one or more first location updates at a tracking server, and wherein tracking the one or more second location updates comprises receiving the one or more second location updates at the tracking server.

12. The method of claim 1, wherein tracking the one or more first location updates comprises generating the one or more first location updates at a mobile device, and wherein tracking the one or more second location updates comprises receiving the one or more second location updates at the mobile device.

13. A tracking server comprising:
    a memory; and
    a processor coupled to the memory, the processor configured to:
        detect a trigger for asset transportation verification;
        track one or more first asset location updates of a first asset tracking device;
        track one or more second asset location updates of a second asset tracking device;
        determine, responsive to the trigger, whether the second asset tracking device is co-located with the first asset tracking device based upon the one or more first asset location updates and the one or more second asset location updates; and generate an alert in response to determining the first asset tracking device is not co-located with the second asset tracking device.

14. The tracking server of claim 13, wherein the trigger comprises one or more of:
the first asset tracking device or the second asset tracking device departing a pickup location;
movement of the first asset tracking device or the second asset tracking device;
an estimated time of departure; or
a manual trigger.

15. The tracking server of claim 13, wherein the processor configured to determine whether the second asset tracking device is co-located with the first asset tracking device comprises the processor configured to:
calculate a first route based on the one or more first asset location updates;
calculate a second route based on the one or more second asset location updates; and
determine the second asset tracking device is not co-located with the first asset tracking device when a distance between corresponding points on the second route and first route exceeds a threshold distance.

16. The tracking server of claim 15, wherein the first route and the second route are further based on a known transportation route.

17. The tracking server of claim 13, wherein the processor configured to determine whether the second asset tracking device is co-located with the first asset tracking device comprises the processor configured to:
determine a distance between a first location update of the one or more first location updates and a second location update of the one or more second location updates; and
determine the second asset tracking device is not co-located with the first asset tracking device when the distance exceeds a threshold distance.

18. The tracking server of claim 13, wherein the processor configured to determine whether the second asset tracking device is co-located with the first asset tracking device comprises the processor configured to:
determine whether or not the first asset tracking device is in motion;
determine whether or not the second asset tracking device is in motion; and
determine the second asset tracking device is not co-located with the first asset tracking device when either the first asset tracking device or the second asset tracking device is determined to be not in motion while the other of the first asset tracking device or the second asset tracking device is determined to be in motion.

19. The tracking server of claim 13, wherein the processor configured to determine whether the second asset tracking device is co-located with the first asset tracking device comprises the processor configured to:
determine, based on the one or more first asset location updates, the first asset tracking device is located at a pickup location;
determine, based on the one or more second asset location updates, that the second asset tracking device has departed the pickup location; and
determine the second asset tracking device is not co-located with the first asset tracking device when the first asset tracking device is at the pickup location after the second asset tracking device has departed the pickup location.

20. The tracking server of claim 13, wherein the processor configured to determine whether the second asset tracking device is co-located with the first asset tracking device comprises the processor configured to:
determine, based on the one or more first asset location updates, the first asset tracking device has departed a pickup location;
determine, based on the one or more second asset location updates, that the second asset tracking device has not departed the pickup location; and
determine the second asset tracking device is not co-located with the first asset tracking device when the second asset tracking device has not departed the pickup location while the first asset tracking device has departed the pickup location.

21. The tracking server of claim 13, wherein the processor is further configured to generate a confirmation alert in response to determining a driver tracking device is co-located with the first asset tracking device.

22. The tracking server of claim 13, wherein the processor is further configured to:
receive one or more third asset location updates from a third asset tracking device; and
determine, responsive to the trigger, whether the third asset tracking device is co-located with the second asset tracking device and the first asset tracking device based upon the one or more first asset location updates, the one or more second asset location updates, and the one or more third asset location updates.

* * * * *